United States Patent

[11] 3,622,568

| [72] | Inventors | Peter Bamberg Enhorna; Berndt Olof Harald Sjoberg, Sodertalje, both of Sweden |
|---|---|---|
| [21] | Appl. No. | 836,616 |
| [22] | Filed | June 25, 1969 |
| [45] | Patented | Nov. 23, 1971 |
| [73] | Assignee | Aktiebolaget Astra Sodertalje, Sweden |
| [32] | Priority | July 9, 1968 |
| [33] | | Great Britain |
| [31] | | 32,634/68 |

[54] OXDIAZOLYL AND THIADIAZOLYL PENICILLINS
7 Claims, No Drawings

[52] U.S. Cl. .................................................. 260/239.1, 424/271

[51] Int. Cl. ........................................................ C07d 99/16
[50] Field of Search ............................................. 260/239.1

[56] References Cited
UNITED STATES PATENTS

| 3,322,751 | 5/1967 | Crast | 260/239.1 |
| 3,322,749 | 5/1967 | Crast | 260/239.1 |

*Primary Examiner*—Nicholas S. Rizzo
*Attorney*—Brumbaugh, Graves, Donohue and Raymond ABSTRACT: Penicillins containing a substituted or unsubstituted oxdiazolylmethyl or thiadiazolyl group in the side chain are disclosed. The compounds are of value as antibacterial agents, as nutritional supplements in animal feeds as agents for treatment of mastitis in cattle and as therapeutic agents in poultry and animals, including man, in the treatment of infectious diseases caused by micro-organisms.

OXDIAZOLYL AND THIADIAZOLYL PENICILLINS

The present invention relates to oxdiazolyl and thiadiazolyl penicillins and their preparation and to pharmaceutical compositions containing them. Particularly it concerns penicillins containing a substituted or unsubstituted oxdiazolylmethyl or thiadiazolylmethyl group in the side chain. The compounds prepared according to the present invention are of value as antibacterial agents, as nutritional supplements in animal feeds as agents for treatment of mastitis in cattle and as therapeutic agents in poultry and animals, including man, in the treatment of infectious diseases caused by micro-organisms.

The present invention provides compounds of the general formula

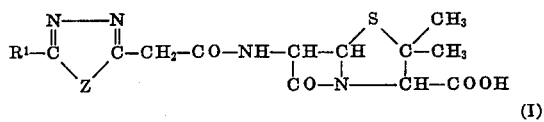

(I)

wherein $R^1$ is a hydrogen atom, a straight or branched alkyl or a cycloalkyl group of at most five carbon atoms, a phenyl group, which is unsubstituted or substituted with at least one member selected from the class consisting of halogen atoms, a hydroxy group and straight and branched alkoxy and alkyl groups of at most four carbon atoms; monocarbocyclic aralkyl groups of six to 10 carbon atoms, carbethoxy or a monocarbocyclic heterocyclic group selected from the class consisting of pyridyl and pyridyl substituted with a hydroxy group or a halogen atom and thiazolyl groups, and Z is O or S.

Illustrative examples of compounds according to the invention are:

5-phenyl-1,3,4-thiadiazolyl-2-methylpenicillin,
5-phenyl-1,3,4-oxdiazolyl-2-methylpenicillin,
α-(5-m-chlorophenyl-1,3,4-oxdiazolyl-2)-benzylpenicillin,
5-methyl-1,3,4-oxidazolyl-2-methylpenicillin.

The invention also comprises nontoxic salts of compounds of the formula I. The salts include nontoxic metallic salts as sodium, potassium, calcium or aluminum salts, ammonium salts, and substituted ammonium salts, e.g. salts of such nontoxic amines as trialkylamines, including triethylamine, procaine, dibenzylamine, N-benzyl-β-phenethylamine, 1-ephenamine, N,N-dibenzylethylene-diamine, dehydroabietylamine, N,N'-bisdehydroabietylethylene diamine, and other amines, which have been used to form salts with benzyl penicillin or phenoxymethyl penicillin.

The present invention further provides a process for the preparation of compounds of the formula I, which process comprises reacting a compound of the general formula

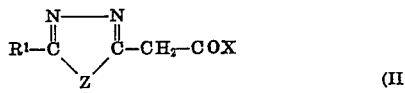

(II)

with 6-aminopenicillanic acid or a salt of it in organic or aqueous organic solutions or with a derivative of 6-aminopenicillanic acid of the formula

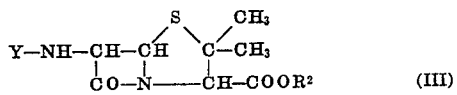

(III)

in organic solutions, in which formulas $R^1$ and Z are as defined above, $R^2$ represents trialkylsilyl, a phenacyl group, which may be unsubstituted or substituted with one or more halogen atoms, lower alkyl, lower alkoxy, or nitro groups, or $R^2$ represents

wherein $R^3$, $R^4$ and $R^5$ may be the same or different and each represents a monovalent hydrocarbon group, for example an alkyl, aryl or aralkyl group, or $R^2$ represents a nitro or halogen substituted benzyl group, or a monocarbocyclic arylsulphonylethyl group; CO—X and Y—NH are groups of atoms capable of reacting with each other with formation of a carbon-nitrogen bond, so that, if necessary or desired after hydrolysis a —CO—NH— group is obtained, particularly Y is hydrogen or at the same time as $R^2$ is a trialkylsilyl group.

The compound of the general formula II may be an acid chloride or its functional equivalent as an acylating agent for a primary amino group, such as an acid azide, an acid bromide, an activated ester, an anhydride, a mixed anhydride, especially one formed with an alkoxy formic acid or the appropriate acid in the presence of a condensing agent such as a carbodiimide or other compounds functioning in a similar way, such as N,N'-carbonyldiimidazole, N-ethyl-5-phenylisoxazolium-3'-sulphonate or N-t-butyl-5-methyl-isoxazolium perchlorate.

The reaction is desirably carried out in an organic solvent, such as tetrahydrofuran, dimethylformamide, acetonitril, methylene chloride, or a mixture thereof and at room temperature or below, preferably between −5° and +5° C. In order to obtain complete acylation of the 6-aminopenicillanic acid esters (III) an excess of the acylating agent may be used and the acylation product can be freed from excess acylating agent by treatment at pH 7 with water. After purification of the acylation product the ester linkage may readily be cleaved by simple procedures without any appreciable destruction of the penicillin molecule taking place. Cleavage can be brought about by treatment with certain basic nucleophilic agents in aqueous or nonaqueous solution e.g. with a monocarbocyclic arylthiolate in dimethylformamide. In nonaqueous media the penicillin may be obtained directly in crystalline form, e.g. as the sodium or potassium salt. The ester group can also be removed by treatment with an acid under mild conditions are regards pH and temperature.

The pharmaceutical compositions of the invention comprise at least one penicillin of the invention and a pharmaceutically acceptable carrier or diluent.

Certain of the penicillins defined in formula I may be prepared by fermentation or enzymatic coupling.

If the compounds of the general formula II contain one or more asymmetric centers the resulting compounds of the general formula I may exist in different diastereoisomeric forms, which all are biologically active. It is to be understood that the present invention comprises the diastereoisomers as well as mixtures of them.

The following examples illustrate the invention:

Example 1. Potassium 5-phenyl-1,3,4-thiadiazolyl-2-methyl-penicillinate.

To an ice-cooled mixture of tributyltin 6-aminopenicillanate (4.05 g.; 0.008 mole) and 5-phenyl-1,3,4-thiadiazolyl-2-acetic acid (2.3 g.; 0.0105 mole) in methylene chloride (25 ml.) a solution of N,N'-dicyclohexylcarbodiimide (2.16 g.; 0.0105 mole) in methylene chloride (15 ml.) was added dropwise. The mixture was kept at 4° C. for 15 hours, then ethyl acetate (100 ml.) was added, the N,N'-dicyclohexylurea was removed by filtration and the clear solution was washed with water at pH 6.5. After evaporating the solvent the residue (6.7 g.) was reprecipitated from benzene/petroleum ether yielding 5.9 g. of tributyltin 5-phenyl-1,3,4-thiadiazolyl-2-methyl-penicillinate. This was dissolved in dimethylformamide (7 ml.) containing potassium thiophenoxide (1.18 g.; 0.008 mole) and shaken for 30 min. at room temperature whereby the potassium salt of the penicillin started to precipitate. The suspension was poured into acetone (70 ml.) and the precipitated product was collected. Purity 97 percent IR-absorption at 1760 cm.⁻¹.

The penicillin was chromatographically pure and inhibited the growth of *Streptococcus pyogenes* and *Streptococcus*

*viridans* at a concentration of 0.006 mcg/ml. and of *Staphylococcus aureus*, Oxford at 0.03 mcg/ml.

Potassium 5-phenyl-1,3,4-oxdiazolyl-2-methylpenicillinate was prepared in a similar way starting with 5-phenyl-1,3,4-oxdiazolyl-2-acetic acid. IR-absorption at 1760 cm.$^{7E^1}$, purity 87 percent minimum inhibitory concentration against *Str. viridans* and *Str. pyogenes* 0.006 mcg/ml. and against *Staph. aureus*, Oxford 0.06 mcg/ml.

In analogous way the following compounds of formula I wherein $R^1$ and Z have the specified meaning were also prepared with the assigned minimum inhibitory concentration (MIC) against *Staphylecoccus aureus*, Oxford.

| $R_1$ | Z | Purity, percent | IR-absorption, cm-1 | MIC, mcg./ml. |
|---|---|---|---|---|
| phenyl | O | 87 | 1,760 | 0.06 |
| 2-hydroxyphenyl (OH) | S | 89 | 1,740 | 0.06 |
| iodophenyl (I) | O | 91 | 1,760 | 0.03 |
| Same as above | S | 86 | 1,740 | 0.01 |
| bromophenyl (Br) | O | 92 | 1,760 | 0.03 |
| Same as above | S | 98 | 1,760 | 0.03 |
| methoxyphenyl (OCH₃) | S | 96 | 1,760 | 0.03 |
| Same as above | O | 79 | 1,770 | 0.06 |
| methylphenyl (CH₃) | S | 98 | 1,780 | 0.03 |
| Same as above | O | 82 | 1,775 | 0.03 |
| isopropylphenyl (CH(CH₃)₂) | O | 84 | 1,765 | 0.03 |
| Same as above | S | 105 | 1,775 | 0.03 |

Example 2. Potassium 5-(m-bromophenyl)-1,3,4-oxidiazolyl-2-methylpenicillinate.

To an ice-cooled mixture of 5-(m-bromophenyl)-1,3,4-oxdiazolyl-2-acetic acid (1.0 g.; 0.0035 mole) and p-bromophenacyl 6-aminopenicillanate sulfonic acid salt (1.0 g.; 0.0018 mole) in dimethylformamide (4 ml.) N,N′-dicyclohexylcarbodiimide (0.36 g.; 0.0018 mole) in dimethylformamide (1 ml.) was added with stirring. After 15 hours at +4° C. ethyl acetate (10 ml.) and the dicyclohexylurea was removed by filtration. The filtrate was washed with saturated bicarbonate solution and with brine, dried and stripped in vacuo. To the residue potassium thiophenoxide (0.16 g.; 0.0011 mole) in dimethylformamide (4 ml.) was added. After 30 min. at 25° C. the mixture was poured into 20 ml. of acetone and the product collected by filtration. IR-absorption 1760 cm.$^{7E^1}$ (β-lactam).

Example 3. Potassium 5-(m-bromophenyl)-1,3,4-oxdiazolyl-2-methylpenicillinate.

To an ice-chilled solution of 5-(m-bromophenyl)-1,3,4-oxdiazolyl-2-acetic acid (0.95 g.; 0.0034 mole) and triethylamine (ml.; ml; 0.0034 mole) in nitromethane N-ethyl-5-phenylisoxazolium-3′-sulfonate (0.86 g.; 0.0034 mole) and tributyltin 6-aminopenicillanate (1.62 g.; 0.0032 mole) was added with stirring. After 15 hours at +4° C. chloroform (14 ml.) was added and the mixture washed with water. The organic phase was dried and evaporated, the residue was dissolved in dimethylformamide (4.2 ml.) containing potassium thiophenoxide (0.475 g.; 0.0032 mole) and the mixture was shaken for 45 min. at 25° C. Then it was poured into ice-cooled ether (70 ml.) and the precipitated product (1.41 g.) was collected by filtration. IR-absorption 1765 cm.$^{7E^1}$ (β-lactam).

We claim:

1. A compound selected from the group consisting of

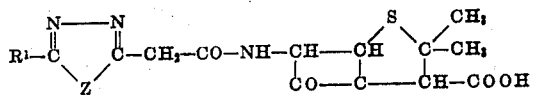

and a nontoxic salt thereof wherein $R^1$ is a phenyl group which is unsubstituted or substituted with a halogen, a hydroxy group of straight alkoxy and alkyl groups of at most four carbon atoms; carbethoxy; pyridyl; pyridyl substituted with a hydroxy group or a halogen atom, and Z is O or S.

2. A penicillin according to claim 1 and nontoxic salts thereof, wherein Z is S.

3. A compound selected from the group consisting of 5-Phenyl-1,3,4-thiadiazolyl-2-methylpenicillin and a nontoxic salt thereof.

4. A compound selected from the group consisting of 5-(m-Bromophenyl)-1,3,4-thiadiazolyl-2-methylpenicillin and a nontoxic salt thereof.

5. A compound selected from the group consisting of 5-(m-Bromophenyl)-1,3,4-oxdiazolyl-2-methylpenicillin and a nontoxic salt thereof.

6. A compound selected from the group consisting of 5-(o-Methoxyphenyl)-1,3,4-thiadiaxolyl-2-methylpenicillin and a nontoxic salt thereof.

7. A compound selected from the group consisting of 5-(m-tolyl)-1,3,4-thiadiazolyl-2-methylpenicillin and a nontoxic salt thereof.

* * * * *

PO-1050
(5/69)

UNITED STATES PATENT OFFICE
CERTIFICATE OF CORRECTION

Patent No. __3,622,568__       Dated __November 23, 1971__

Inventor(s) __Peter Bamberg and Berndt Olof Harald Sjoberg__

It is certified that error appears in the above-identified patent and that said Letters Patent are hereby corrected as shown below:

Column 1, line 36, "α-(5-m-chlorophenyl-1,3,4-oxdiazolyl-2)-benzylpenicillin" should be --α-(5-m-chlorophenyl-1,3,4-oxdiazolyl-2)-benzylpenicillin--.

line 37, "5-methyl-1,3,4-oxidazolyl-2-methylpenicillin" should be --5-methyl-1,3,4-oxdiazolyl-2-methylpenicillin--.

line 44, "N,N" should be --N,N'--.

Column 2, line 54, should be underscored in full.

line 73, "cm.⁷ᴱ¹" should be --cm⁻¹--.

Column 3, line 1, "of 0.006 should be --of ≤ 0.006--.

line 5, "cm.⁷ᴱ¹" should be --cm⁻¹--.

line 7, "pyogenes 0.006" should be --pyogenes ≤ 0.006--.

line 20, " 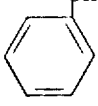 " should be -- 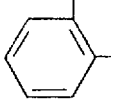 --.

line 40, " 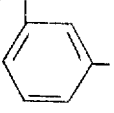 " should be -- 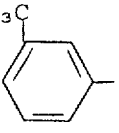 --.

line 51, should be underscored in full and "oxidiazolyl" should be --oxdiazolyl--.

Column 4, lines 3 and 4, "in vacuo" should be --in vacuo--.

line 8, "cm.⁷ᴱ¹" should be --cm⁻¹--.

line 11, should be underscored in full.

line 14, "(ml.;ml; 0.0034 mole)" should be --(0.48 ml; 0.0034 mole)--.

line 24, "cm.⁷ᴱ¹" should be --cm⁻¹--.

Signed and sealed this 23rd day of May 1972.

(SEAL)
Attest:

EDWARD M. FLETCHER, JR.        ROBERT GOTTSCHALK
Attesting Officer              Commissioner of Patents